(12) United States Patent
Yamaizumi et al.

(10) Patent No.: US 7,966,601 B2
(45) Date of Patent: Jun. 21, 2011

(54) GENERATING WEB SERVICE WITHOUT CODING LOGIC WITH A PROGRAMMING LANGUAGE

(75) Inventors: Takayuki Yamaizumi, Yokohama (JP); Samuel S. Adams, Apex, NC (US); Brian Price, Wake Forest, NC (US); Rachel K. E. Bellamy, Bedford, NY (US); Jonathan P. Brezin, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1634 days.

(21) Appl. No.: 11/141,679

(22) Filed: May 31, 2005

(65) Prior Publication Data

US 2006/0271644 A1 Nov. 30, 2006

(51) Int. Cl.
*G06F 9/44* (2006.01)
(52) U.S. Cl. .................... 717/114; 717/106; 717/110
(58) Field of Classification Search ................... None
See application file for complete search history.

(56) References Cited

U.S. PATENT DOCUMENTS

| | | | | |
|---|---|---|---|---|
| 3,609,697 | A * | 9/1971 | Blevins et al. | 717/106 |
| 7,584,245 | B2 * | 9/2009 | Park | 709/203 |
| 2003/0115548 | A1 * | 6/2003 | Melgar | 715/513 |
| 2004/0083463 | A1 * | 4/2004 | Hawley | 717/140 |
| 2004/0133876 | A1 * | 7/2004 | Sproule | 717/105 |
| 2005/0125771 | A1 * | 6/2005 | Vitanov et al. | 717/104 |

OTHER PUBLICATIONS

Crespo and Bier "WebWritter: A Browser-Based Editor for Constructing Web Applications", 1996, Computer Networks and ISDN Systems, vol. 28, No. 7-11, pp. 1291-1306.*
Christensen, Curbera, Meredith and Weerawarana "Web Services Description Language (WSDL) 1.1", 2001, downloaed from <http://www.w3.org/TR/wsdl> on May 7, 2010.*
"WAP WML Wireless Application Protocol Wireless Markup Language Specificaqtion Version 1.1", 1999.*
Quanzhong Li et al., XVM: A Bridge between XML Data and Its Behavior, Proceedings of WWW 2004, May 17-22, 2004, New York, NY, pp. 155-163.
IBM Homebuilder Brochures and Specification Sheets, Linux V4.0, Windows V5.0 & 6.0, copyright 1995, 2000, 2001.
Hypercard Wikipedia entry, http://en.wikipedia.org/wiki/HyperCard, HyperCard originally released in 1987.

* cited by examiner

*Primary Examiner* — Jason Mitchell
(74) *Attorney, Agent, or Firm* — Elissa Y. Wang

(57) ABSTRACT

A network-accessible Web service is generated without a user having to code the logic of the Web service using a programming language. The Web service is represented as a sheet element within a graphical user interface (GUI) displayed on the screen of a computing device. A number of cards for the Web service are defined. The cards define the logic of the Web service, and effectuate the functionality of the Web service. Each card is represented as a card element on the sheet element within the GUI. By manipulating and modifying the cards, a user is thus able to generate a Web service without having to code the logic of the Web service with a programming language.

20 Claims, 5 Drawing Sheets

GENERATING WEB SERVICE WITHOUT CODING LOGIC WITH A PROGRAMMING LANGUAGE

FIELD OF THE INVENTION

The present invention relates generally to Web services, such as Web services accessible over a network like the Internet using a web-browsing program, and more particularly to the generation of such Web services without a user having to code the logic of the Web service with a programming language.

BACKGROUND OF THE INVENTION

Web services are dynamic applications accessible over a network, such as the Internet, an intranet, and/or an extranet, using a web-browsing program. Unlike static web pages, Web services present web pages that provide dynamic content. For instance, a user may be able to enter in a stock symbol, and in response have the current price of the stock with that stock symbol returned.

Web services traditionally have been constructed using programming languages. A Web service developer hard codes the logic of a Web service so that the Web service is able to provide a desired functionality. Hard coding is accomplished with a programming language, such as the Java programming language, the hypertext markup language (HTML) or another programming language. As a result, for a user to be able to construct a Web service, he or she has to be skilled at one or more programming languages.

This requirement makes it difficult for users who are not skilled at programming languages to construct Web services. Such users may have to contract the services of a skilled developer in order to construct a desired Web service. Alternatively, such users may decide not to construct a Web service at all, even if one is desired. For these and other reasons, therefore, there is a need for the present invention.

SUMMARY OF THE INVENTION

The present invention relates to the generation of a network-accessible Web service without a user having to code the logic of the Web service using a programming language. A method of the invention represents the Web service as a sheet element within a graphical user interface (GUI) displayed on the screen of a computing device. A number of cards for the Web service are defined. The cards define the logic of the Web service, and effectuate the functionality of the Web service. Each card is represented as a card element on the sheet element within the GUI. By manipulating and modifying the cards, a user is thus able to generate a Web service using this method without having to code the logic of the Web service with a programming language.

A computing system of the invention includes a computer-readable medium and a computer program stored on the computer-readable medium. The computer program allows a user to generate a Web service using a GUI, without the user having to code the logic of the Web service using a programming language. The Web service includes a sheet representing the Web service within the GUI, and a number of cards for the Web service. The cards are represented within the GUI as card elements, and define the logic of the Web service, thus effectuating the functionality of the Web service.

Another method of the invention enables a preexisting Web service defined in a Web services description language to be translated to graphical representation within a GUI as a sheet and a number of cards. The method inputs a file describing the Web service that is formatted in accordance with the Web services description language. The method parses the file to generate the cards of the Web service that define the logic thereof and effectuate the functionality of the Web service. A sheet representing the Web service is displayed within the GUI, as are card elements corresponding to the cards. A user can then modify the Web service without having to recode the logic of the Web service using a programming language.

Embodiments of the invention provide for advantages over the prior art. Unlike Web service development within the prior art, Web service development via the present invention is accomplished without a user having to code the logic of a Web service using a programming language. As a result, the user does not have to be skilled in a given programming language in order to generate a Web service, nor does the user have to contract a developer skilled in the programming language to generate the Web service. Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
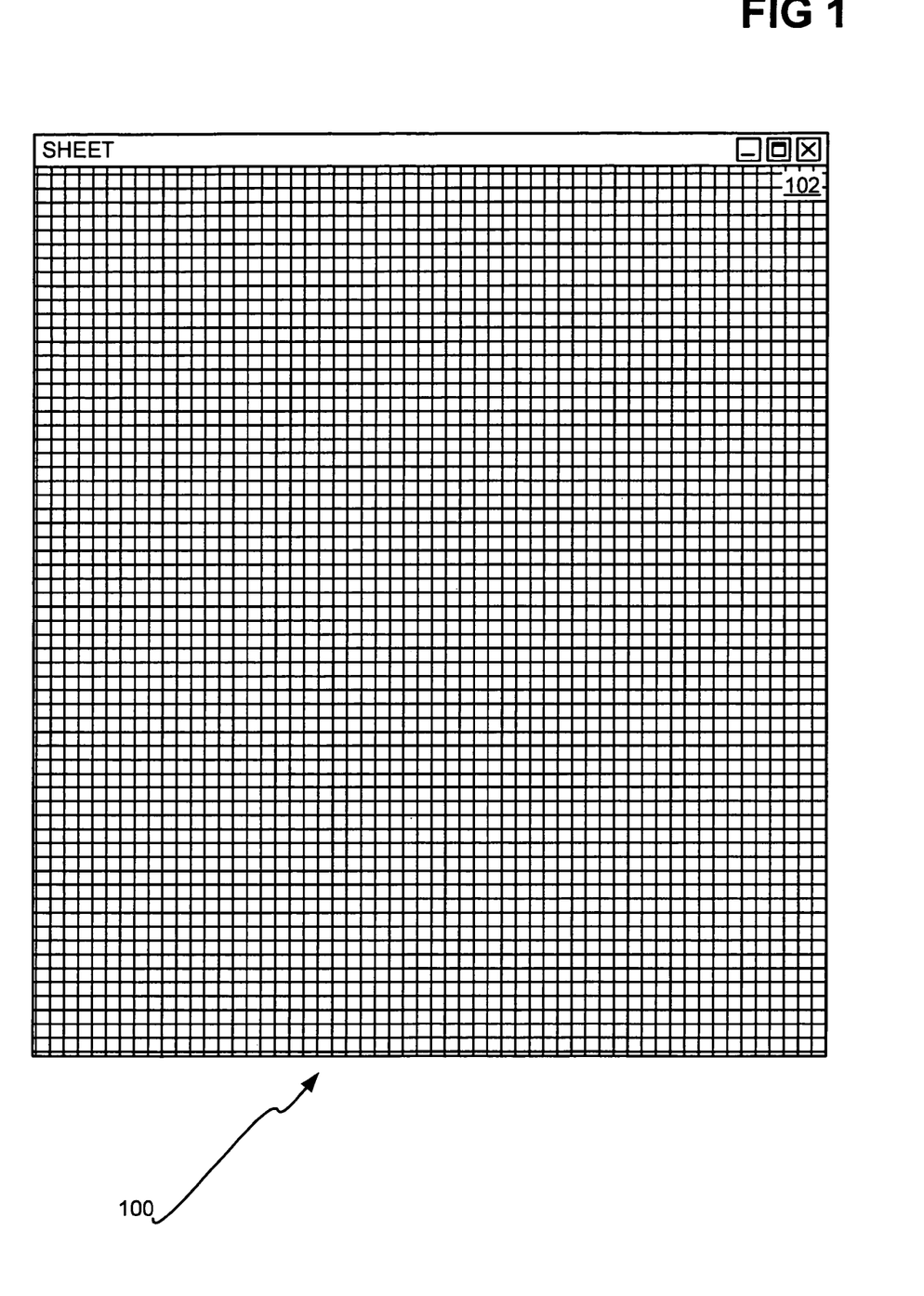
FIG. 1 is a diagram of a sheet element representing a Web service within a graphical user interface (GUI), according to an embodiment of the invention.

FIG. 1 shows a sheet element 102 representing a Web service within a graphical user interface (GUI) 100, according to an embodiment of the invention. As has been described, a Web service is a dynamic application that is accessible over a network, such as the Internet, an intranet, and/or an extranet, using a web-browsing program. Unlike static web pages, Web services present web pages that provide dynamic content. The GUI may be that provided by an operating system, and is displayed on a screen of a computing device, like a display device connected to a computing device. The sheet element 102 may be considered a "slate" on which other GUI elements, such as card elements as will be described, are modified and manipulated to realize the Web service that the sheet element 102 represents. As such, a user is able to define the logic of the Web service, to achieve a given functionality, without having to use a programming language.

Figure 2:
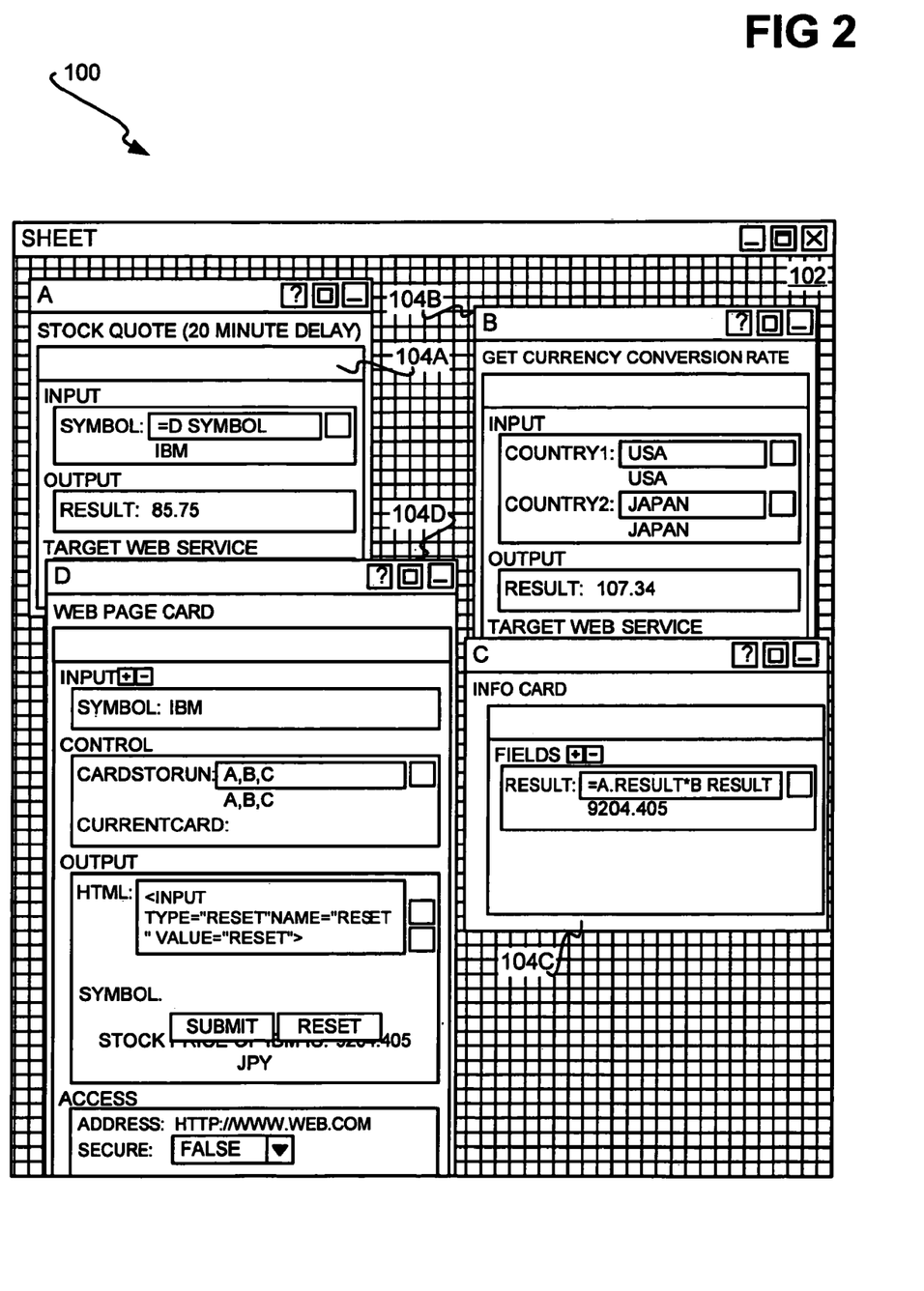
FIG. 2 is a diagram of a number of card elements on the sheet element of FIG. 1, and which represent cards of the Web service that define the logic of the Web service to effectuate the functionality of the Web service, according to an embodiment of the invention, and is suggested for printing on the first page of the patent.

FIG. 2 shows a number of card elements 104A, 104B, 104C, and 104D being displayed on the sheet element 102 within the GUI 100, according to an embodiment of the invention. The card elements 104A, 104B, 104C, and 104D, are collectively referred to as the card elements 104. The card elements 104 represent cards of the Web service, which are individual components of the Web service that can be interrelated to one another, and which in sum serve to define the logic of the Web service to achieve a functionality of the Web service. The logic of the Web service is how the Web service is executed, or operates, to achieve its intended functionality. The logic of the Web service is more specifically represented as the sheet element 100 having the card elements 104 thereon. Each card has a unique identifier relative to the other cards. For instance, the card elements 104A, 104B, 104C, and 104D represent cards having identifiers A, B, C, and D, respectively.

As depicted in FIG. 2, the cards represented by the card elements 104 may have a number of fields. Fields can include input fields, output fields, control fields, and access fields, among other types of fields. An input field can include an area for a user to input a character string, a character string description to indicate the type of input that should be entered into the area, and a button for the user to confirm the content of the input. An input field is thus a field intended for a user to input information that will be manipulated by the card to provide a part of the logic of the Web service itself.

An output field can include an area depicting the character string output of the card, a character string description to indicate the type of output that is provided, and a button for the user to confirm the content of the output. As such, an output field is a field intended to provide a user information, based on, for instance, manipulation of the input of the card, to provide a part of the logic of the Web service itself. Each field has an identifier that identifies that field in relation to the card of which it is a part. The character string input of a card can include a mathematical expression and/or a conditional expression.

Each card has a given functionality, such that the functionalities of the cards as a whole are interrelated to one another to define the logic of the Web service and achieve the functionality of the Web service. This is described by the example specifically depicted in FIG. 2. The card element 104A represents a stock quote card that is able to obtain the current stock price of a stock. The input field of the stock quote card specifies the symbol of the stock for which the price is to be looked up. In FIG. 2, the card element 104A has the input field "D.Symbol". This denotes that the input field is to be populated with a symbol provided by the card having the identifier D (represented by the card element 104D in FIG. 2), and more specifically the field "Symbol" of this card. Thus, the card represented by the card element 104A is interrelated with the card represented by the card element 104D, so that the stock in relation to which the card element 104A performs its functionality is selected based on output from the card element 104D.

The output field of the stock quote card represented by the card element 104A is the current stock price for this input stock. The card element 104A is therefore programmed in a predetermined manner so that its functionality is to provide stock quotes for stocks. The card elements 104 in general are thus preconstructed building blocks, which may have to be coded using a programming language, but which once coded can be used to construct Web services without having to use a programming language. In the case of the card element 104A, a target Web service field may denote a network address, such as a universal resource locator (URL) address, at which stock prices can be obtained by inputting stock symbols.

Next, the card element 104B represents a currency conversion card that is able to convert one currency to another. The input fields of the currency conversion card specify the currency of the country to be converted from, and the currency of the country to be converted to. In the example of FIG. 2, then, the currency conversion card is to convert one United States dollar (USD) to a number of Japanese yen (JPY). The output field of the currency conversion card specifies how much one unit of the former currency is worth in the latter currency. Thus, as depicted in the example of FIG. 2, one USD has been converted as being worth 107.34 JPY. As with the card element 104A, a target Web service field may denote a network address at which such currency conversions can take place. The functionality of the card element 104B is to accomplish currency conversion.

Next, the card element 104C represents an information card that has a single field. The field of the information card allows for a mathematical expression to be inserted, which is then evaluated by the information card and displayed as the output of the card. In the example of FIG. 2, the field is "=A.Result*B.Result." This means that the output field Result of the card A, represented by the card element 104A, is multiplied by the output field Result of the card B, represented by the card element 104B, and the resulting product is displayed as the output of the output field of the card element 104C. In effect, the card element 104C takes the current stock price of a selected stock, as provided by the card A and which may be in USD, and multiplies it by the currency conversion provided by the card B which converts one USD to JPY, to provide the current stock price of the selected stock in JPY. The card element 104C is thus interrelated with the card elements 104A and 104B.

Finally, the card element 104D represents a special type of card, referred to as a web page card. There is preferably one web page card per Web service. The web page card includes an access field, which specifies the network address, such as the URL, at which the Web service being defined can be accessed. The web page card further includes a control field, which provides an ordered list of the cards of the Web service, the list being the order in which the cards are to be executed to realize the logic of the Web service. Thus, in the example of FIG. 2, first the card A is executed, then the card B is executed, and finally the card C is executed. The input field of the web page card, Symbol, is the stock symbol for the Web service, which is used by the card A to determine which stock price to look up.

The output field of the web page card specifies HTML code, or code of another programming language, to describe how input is to be achieved into the Web service, and how output is to be achieved from the Web service when the Web service is accessed over a network like the Internet through a web-browsing program. It is noted that while a user may be required to provide code to define the input and/or output of the Web service, the user does not have to provide code to define the logic of the Web service, which is instead defined via changing or modifying the various cards of the Web service, and how those cards are interrelated to one another. Further, the web page card may have default HTML code to specify the output and input are achieved relative to the Web service, which can then be simply modified by a user to realize different output or input.

In the example of FIG. 2, the output field of the web page card represented by the card element 104D provides for the word "Symbol" being displayed, followed by an area in which a user is able to enter a stock symbol, and submit and reset buttons. The latter button clears any entry from the area in which the user is able to enter a stock symbol, whereas the former button runs the Web service to retrieve the stock price of the desired stock in JPY. As such, the output field does not define the logic of the Web service, but merely defines how a user accessing the Web service over a network is able to interact with the Web service.

By comparison, the logic of the Web service of the sheet element 102 of FIG. 2 is defined by the cards represented by the card elements 104 as follows. A user accessing the Web service, at the network address specified by the access field of the card element 104D, is displayed the output depicted in the output field of the card element 104D. The user is thus able to enter in a stock symbol, and select the submit button. Once the submit button has been pressed, the web page card executes the cards A, B, and C, as specified in the control field. Therefore, first the card A is executed, which retrieves the stock price of the stock symbol in question, provided an output field "Result" that can be referenced by other cards as "A.Result." The card A retrieves the stock price of the stock symbol entered by the user, because the card A retrieves the stock price for the stock symbol "D.Symbol", which is the stock symbol provided in the symbol field of the card D, which is the web page card.

Next, the card B is executed, which converts one USD to a number of JPY, and providing this number of JPY within the output field "Result" that can be referenced by other cards as "B.Result." Finally, the card C is executed. The card C multiples the output field Result of card A by the output field result of card B, the net effect of which is to provide the stock price of the selected stock symbol in JPY. Once all three cards A, B, and C have been executed, the web page card uses its output field's HTML code to determine what information to report back to the user. In this case, the output field Result of the card C is provided. More specifically, the HTML code of the output field of the web page card in FIG. 2 is depicted as including "Stock price of [=A.symbol] is [=C.Result]." The web page card-parses this information, so that the first bracketed information is replaced by the symbol of the Symbol input field of the card A, and the second bracketed information is replaced by the product of the Result output field of the card D.

The functionality of the Web service represented by the sheet element 102 of FIG. 2 is thus to provide stock prices for stocks in JPY. The logic of this Web service is defined by the cards represented by the card elements 104 on the sheet element 102. The logic is more particularly defined by the individual cards that the card elements 104 represent, as well as how the various fields of those cards are populated, including how the various fields of the cards are populated to interrelate with one another. By appropriately determining which cards a Web service should include, and how those cards should interrelate with one another, the logic of a Web service is defined, without a user having to code this logic in a programming language like Java, HTML, and so on.

A user may thus be presented with a number of predetermined card types, from which the user can select particular card types to instantiate as cards that can then be modified to realize a desired Web service's functionality. These card types may be considered the classes of cards, whereas the particular cards themselves may be considered instantiated objects of the card classes. The card types may themselves be coded using a programming language. However, for the user to generate a Web service using the invention, he or she does not have to know the programming language. Rather, the user only has to instantiate desired cards from selected card types, and then modify the cards as appropriate to interrelate them with one another to achieve the desired functionality of the Web service being generated.

Figure 3:
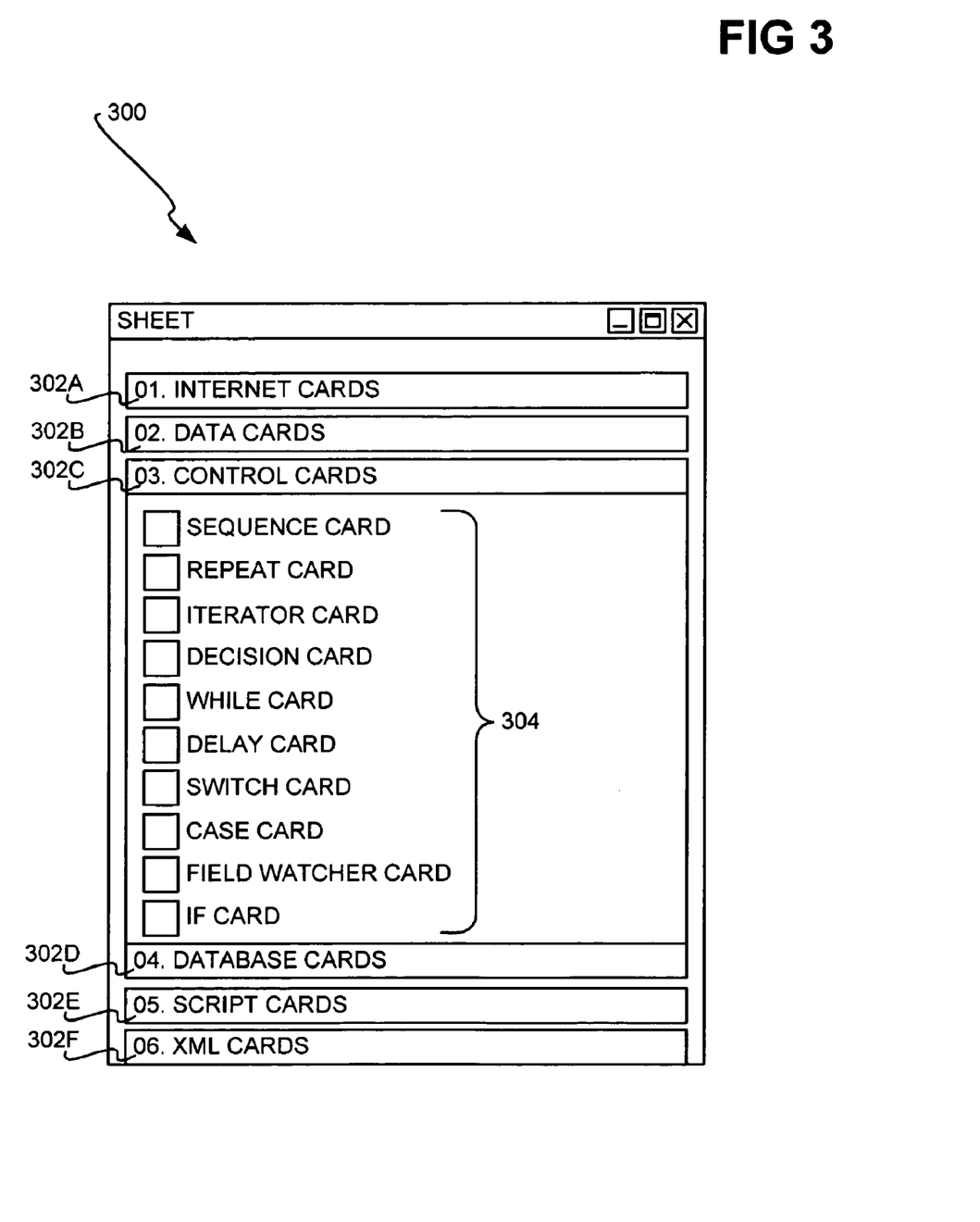
FIG. 3 is a diagram of a window that can be displayed to allow a user to select card types from a number of predetermined card types, organized in groups, from which cards for the sheet element of a Web service are to be instantiated, according to an embodiment of the invention.

In one embodiment, the user is able to call up a list of predetermined card types to select from to instantiate cards. For example, FIG. 3 shows such a window 300 including predetermined card types that may be displayed over the sheet element 102 of FIG. 1, according to an embodiment of the invention. The user may right-click a pointing device, for instance, and select the option to select card types from which to instantiate cards for the sheet element 102. In response, the window 300 is displayed.

The window 300 includes predetermined card types organized into groups, such as the groups 302A, 302B, 302C, 302D, 302E, and 302F, collectively referred to as the predetermined card type groups 302. In the example of FIG. 3, the card type 302C has been selected, such that the predetermined card types 304 are displayed. By selecting one of these card types 304, a card corresponding to the selected card type is instantiated onto the sheet element 102. The user can then modify the card as desired to realize the desired logic and functionality of the Web service corresponding to the sheet element 102 that is being developed. In this way, the user is able to select from many different types of card types, without actually having to code the cards or the card types in a programming language.

Figure 4:
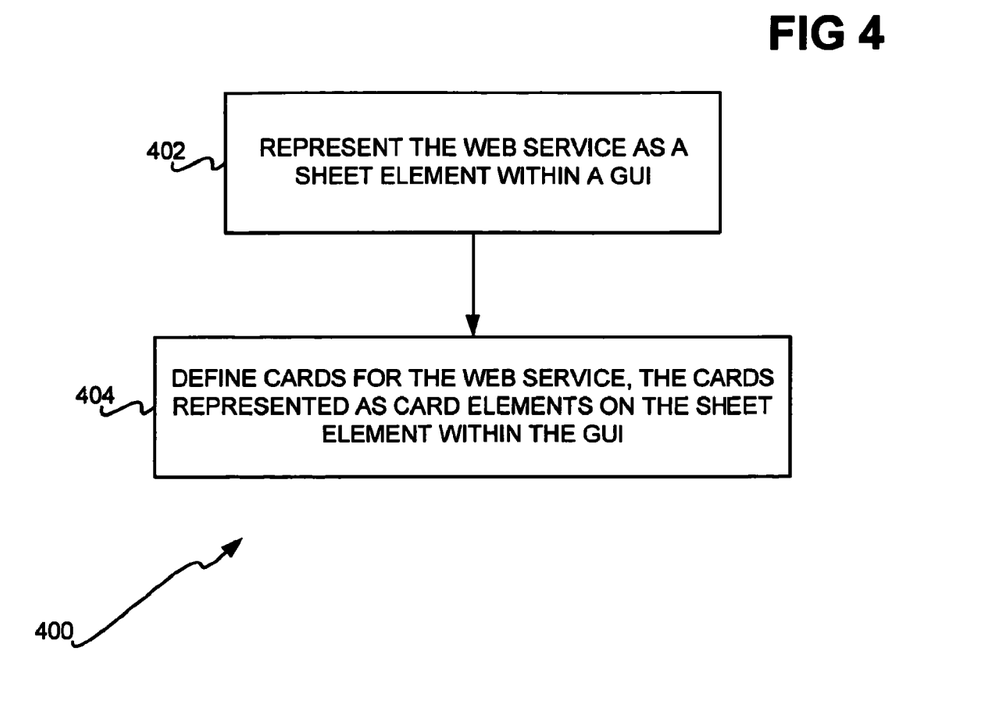
FIG. 4 is a flowchart of a method for generating a Web service, according to an embodiment of the invention.

FIG. 4 shows a method 400 for generating a network-accessible Web service by manipulating and modifying card elements on a sheet element within a GUI, as has been described, according to an embodiment of the invention. The Web service is represented as a sheet element within a GUI that is displayed on a screen of a computing device (402). Cards are defined for the Web service that define a logic of the Web service and effectuate a functionality of the Web service (404), where each card is represented as a card element on the sheet element within the GUI. The method 400 encompasses the Web service generation process that has been described, in which the Web service is generated without a user having to code the logic of the Web service using a programming language.

Defining the cards for the Web service can include defining at least one field for each card, such as input fields, output fields, and so on. The output of an output field of a card may be based on the input of the input fields and/or the output of the output fields of the same or different cards. Likewise, the input of an input field of a card may be based on the input of the input fields and/or the output of the output fields of the same or different cards. In this way, the cards are interrelated to define the logic of the Web service. Unique identifiers of the cards may be employed to allow for a given card to reference another card.

Furthermore, preferably at least one of the cards is a web page card. As has been described, a web page card includes a control field, an access field, and an output field. The control field indicates the order in which the cards are to be executed upon access of the Web service. The access field indicates the address at which the Web service is accessible over a network. The output field defines output to be displayed on a web page for the Web service when the Web service is accessed at the address.

Defining the cards for the Web service can include selecting card types from a list of predetermined card types, and instantiating the cards from the card types selected, as has been described. Such definition may further include modifying input, output, or other fields of these instantiated cards, so that the cards become interrelated to define the logic of the Web service. By having a large number of predetermined card types, a user preferably does not have to ever code a card using a programming language, in order to generate a desired Web service.

Figure 5:
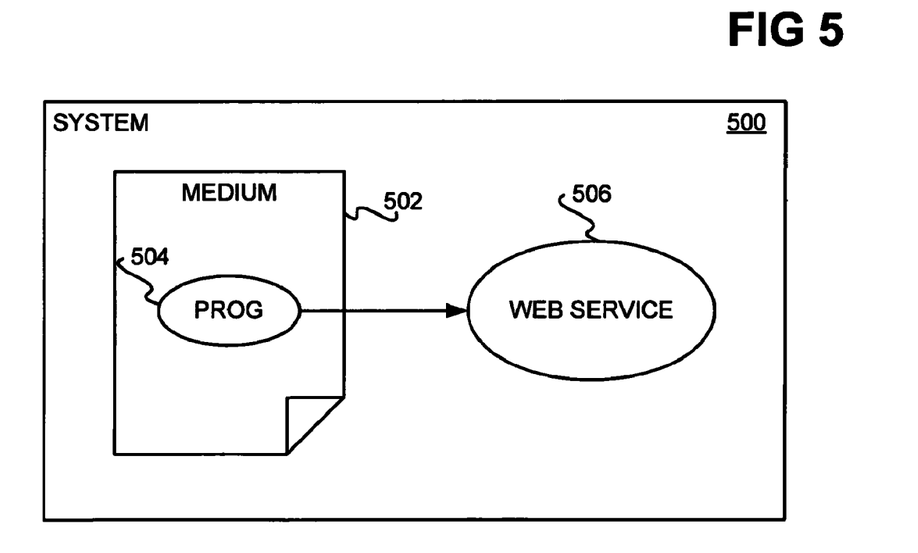
FIG. 5 is a diagram of a system for generating a Web service, according to an embodiment of the invention.

FIG. 5 shows a rudimentary system 500 for generating a Web service with the process that has been described, according to an embodiment of the invention. The system 500 includes a computer-readable medium, on which a computer program 504 is stored. The computer-readable medium 502 may be a volatile or a non-volatile medium, and further may be a semiconductor medium, a magnetic medium, and/or an optical medium, as can be appreciated by those of ordinary skill within the art. The computer program 504 generates a Web service 506 using sheet elements and card elements as has been described. In particular, the computer program 504 realizes a Web service development environment in which such Web service generation can be accomplished.

In one embodiment, a Web service may be divided in execution responsibility between a web server and a web-browsing program. Most of the logic of the Web service is handled by the web server. The only logic of the Web service in this embodiment that is handled by the web browsing program is for user interface purposes, in the context of HTML, dynamic HTML, JavaScript, and so on. Thus, the web server transmits to the web-browsing program the execution results of cards, and cards that have to do with user interface aspects of the Web service. In turn, the web browsing program transmits to the web server data to be input to a given card, and requests for adding, changing, or deleting cards, the latter in the context of Web service development, as opposed to web service execution.

In this latter embodiment, Web service development may thus also be divided between a web server and one or more web browsing programs. As such, a dedicated application program for developing Web services is not needed. The web server serves a user interface to the web browsing programs, and the web browsing programs, using standard HTML, dynamic HTML, JavaScript, and so on, render the user interface. The web browsing programs in this sense are terminals for Web service development that is otherwise essentially accomplished at a web server. Furthermore, a number of developers may be able to work on the same Web service at the same time, using different web browsing programs communicating with the same web server.

It is noted that embodiments of the invention achieve. Web service generation without a user having to code the Web service's logic using a programming language. However, the user may have existing Web services that are described in a Web services description language, such as the Web service definition language (WSDL) maintained by the World Wide Web Consortium and described at the Internet web page http://www.w3c.org. In such instances, the user may wish to incorporate elements of existing Web services into his or her own Web services being generated; using card elements and sheet elements as has been described. That is, the user may wish to translate existing Web services, described in Web services description languages, into card elements and sheet elements, so that the user can use the card elements in particular in his or her own Web services.

Figure 6:
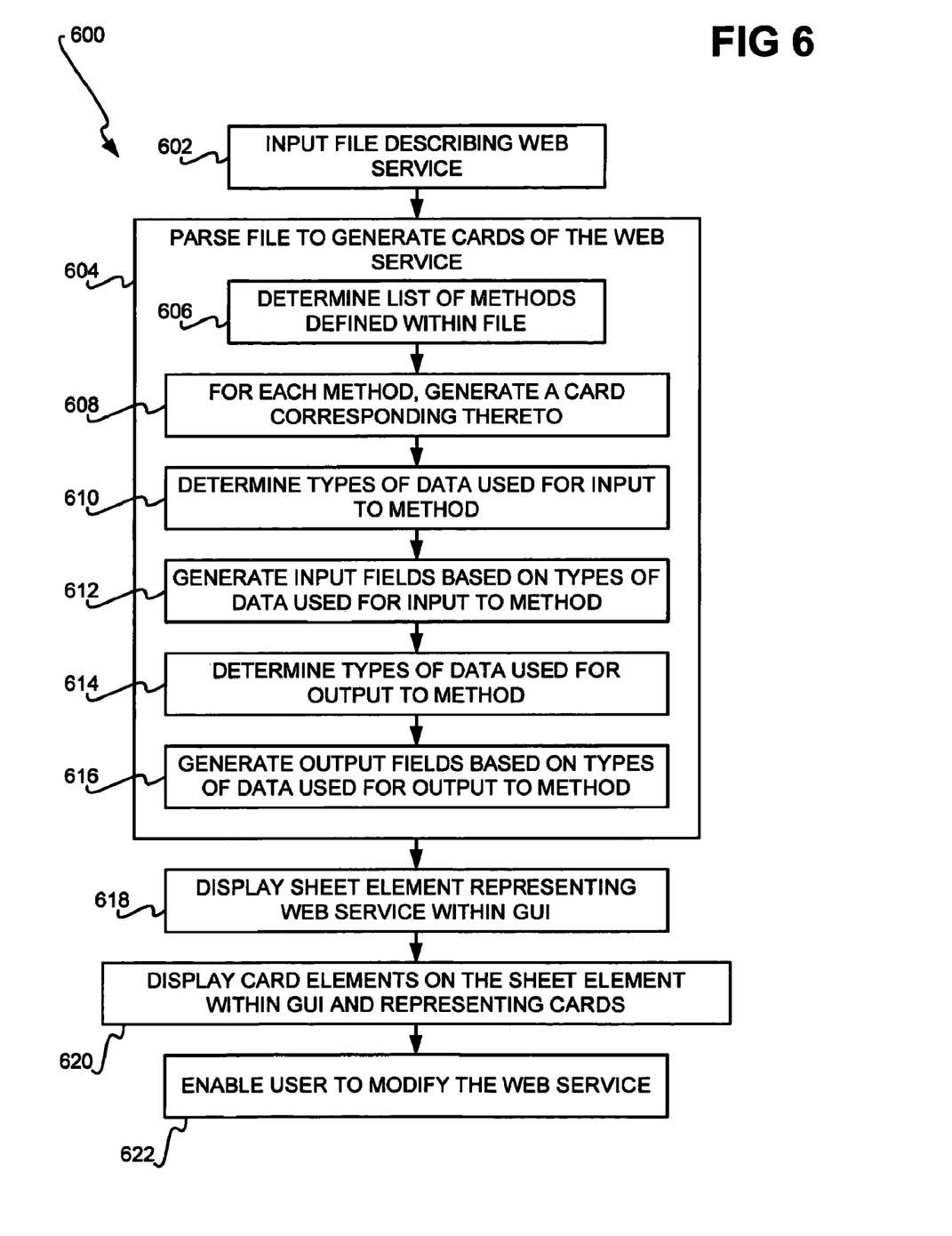
FIG. 6 is a flowchart of a method for representing a Web service that has been defined in a Web services description language as a sheet element within a GUI and having a number of cards, according to an embodiment of the invention.

Therefore, FIG. 6 shows a method 600 for representing a Web service that has been defined in a Web services description language, such as the WSDL, as a sheet, element within a GUI and having a number of cards represented as card elements within the GUI, according to an embodiment of the invention. First, a file describing the Web service in question in accordance with a Web services description languages is input (602). The file is then parsed to generate the cards of the Web service (604). For instance, a list of the services defined within a wsdl:service tag of a WSDL-formatted file may be retrieved, and a list of Web service ports defined within a wsdl:port tag of such a file may be retrieved, where these ports can be used as the predetermined card type group names that have been described.

A list of methods defined within the file is further determined (606). The list of methods may be defined within a wsdl:portType tag of a WSDL-formatted file. For each method, a card corresponding thereto, or a card type, is created (608). The type of data used for input to the method is determined (610), as may be present within a wsdl:types tag, and input fields are generated based on these types of data (612). Likewise, the type of data used for output to the method is determined (614), as also may be presented within a wsdl: types tag, and output fields are generated based on these types of data (616). In one embodiment, a field for displaying a simple object access protocol (SOAP) message actually received form the Web service may also be created. Furthermore, a web page card may be generated for the Web service, including a control field, an access field, and an output field, as has been described.

The data types determined in 610 and 614 may be one of two different types: string-type text data that can be represented directly and in an obvious form, which is referred to herein as simple type data; and, data that includes one or more pieces of data as child data in a data structure and that cannot be represented generally in an obvious form, which is referred to herein as complex type data. The method 600 thus determines whether a given type of data is string-type text data or not. Where the type of data is string-type text data, or simple type data, a field of the card is created that can directly manipulate this data. However, if the type of data is complex type data, then the resulting field is such that only some parts of the data can be directly manipulated within the field. In other words, if the data corresponding to an input field or an output field are complex type data, fields for displaying only some parts of the data are generated, whereas if the data are simple type data, then the corresponding field allows for manipulation of all the data.

The method 600 thus is able to display a sheet element representing the Web service within a GUI (618), such that card elements are displayed on the sheet element within the GUI that represent the cards (620). Furthermore, a user is able to modify the Web service (622), as he or she sees fit, without having to recode the logic of the Web service in a programming language. That is, the user is able to modify and manipulate the cards of the Web service in order to modify the logic and functionality of the Web service, as has been described.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A method for generating a network-accessible Web service comprising:
   representing, by a computing device, the Web service as a sheet element within a graphical user interface (GUI) displayed on a screen of the computing device; and,
   defining a plurality of cards for the Web service, by a user using the computing device, the cards defining a logic of the Web service and effectuating a functionality of the Web service, each card represented as a card element on the sheet element within the GUI,
   wherein the method generates the Web service without a user having to code the logic of the Web service using a programming language,
   wherein the cards include a single web page card and a plurality of other cards, where just the single web page card specifies a network address at which the Web service is accessible, such that none of the other cards specify a network address, and where the single web page card specifies an order in which the other cards are to be executed to realize the logic of the Web service.

2. The method of claim 1, wherein defining the plurality of cards for the Web service comprises, defining at least one field for each card, each field being one of an input field and an output field, an input field having an area in which the user is able to enter input corresponding to the input field, and an output field having an area in which output is displayed to the user.

3. The method of claim 2, wherein the output of the output field of at least one of the cards is based on the input of one or more input fields of the card.

4. The method of claim 2, wherein the output of the output field of at least one of the cards is based on the input of one or more input fields of other cards, and/or on the output of one or more output fields of other cards, such that the cards are interrelated to define the logic of the Web service.

5. The method of claim 4, wherein each card has a unique identifier, such that the output of the output field of at least one of the cards being based on the input of one or more input fields of other cards, and/or on the output of one or more output fields of other cards, is achieved by addressing the other cards by their unique identifiers, followed by identifiers corresponding to the fields of the other cards.

6. The method of claim 2, wherein the input of the input field of at least one of the cards is based on the input of one or more input fields of other cards, and/or on the output of one or more output fields of other cards.

7. The method of claim 6, wherein each card has a unique identifier, such that the input of the input field of at least one of the cards being based on the input of one or more input fields of other cards, and/or on the output of one or more output fields of other cards, is achieved by addressing the other cards by their unique identifiers, followed by identifiers corresponding to the fields of the other cards.

8. The method of claim 1, wherein defining the plurality of cards for the Web service comprises defining the web page card, the web page card comprising:
   a control field indicating the order in which the other cards are to be executed upon access of the Web service;
   an access field indicating the network address at which the Web service is accessible over a network; and,
   an output field defining output to be displayed on a web page for the Web service when the Web service is accessed at the address.

9. The method of claim 1, wherein defining the plurality of cards for the Web service comprises selecting card types from a list of predetermined card types, and instantiating the cards from the card types selected.

10. The method of claim 9, wherein defining the plurality of cards for the Web service further comprises modifying one or more input fields and/or one or more output fields of the cards instantiated from the card types selected to interrelate the cards to define the logic of the Web service.

11. A computing system comprising:
    a computer-readable medium; and,
    a computer program stored in the computer-readable medium, to allow a user to generate a Web service using a graphical user interface (GUI), without the user having to code a logic of the Web service using a programming language, the Web service comprising:
      a sheet element representing the Web service within the GUI; and,
      a plurality of cards for the Web service represented within the GUI as card elements, the cards defining the logic of the Web service and effectuating a functionality of the Web service,
    wherein the cards include a single web page card and a plurality of other cards, where just the single web page card specifies a network address at which the Web service is accessible, such that none of the other cards specify a network address, and where the single web page card specifies an order in which the other cards are to be executed to realize the logic of the Web service.

12. The computing system of claim 11, wherein each card comprises at least one field, each field being an input field or an output field, at least one field of at least one of the cards being based on one or more fields of other cards, such that the cards are interrelated to define the logic of the Web service.

13. The computing system of claim 12, wherein each card has a unique identifier, such that at least one field of at least one of the cards being based on one or more fields of other cards is achieved by addressing the other cards by their unique identifiers, followed by identifiers corresponding to the fields of the other cards.

14. The computing system of claim 11, wherein the web page card comprises:
    a control field indicating the order in which the other cards are to be executed upon access of the Web service;
    an access field indicating the network address at which the Web service is accessible over a network; and,
    an output field defining output to be displayed on a web page for the Web service when the Web service is accessed at the address.

15. The computing system of claim 11, wherein the computer-readable medium stores a plurality of predetermined card types, the computer program allowing the user to select card types from the predetermined card types to instantiate the cards therefrom, and to modify the cards to interrelate the cards to define the logic of the Web service.

16. A method comprising:
    inputting, by a computing device, a file describing a Web service and formatted in accordance with a Web services description language;
    parsing the file, by the computing device, to generate a plurality of cards of the Web service, the cards defining logic of the Web service and effectuating a functionality of the Web service;

displaying, by the computing device, a sheet element representing the Web service within a graphical user interface (GUI); and, displaying, by the computing device, a plurality of card elements on the sheet element within the GUI and representing the cards, wherein the cards include a single web page card and a plurality of other cards, where just the single web page card specifies a network address at which the Web service is accessible, such that none of the other cards specify a network address, and where the single web page card specifies an order in which the other cards are to be executed to realize the logic of the Web service.

17. The method of claim 16, further comprising enabling a user to modify the Web service without having to recode the logic of the Web service using a programming language.

18. The method of claim 16, wherein parsing the file comprises:
   determining a list of methods defined within the file;
   for each method,
      generating a card as corresponding to the method;
      determining one or more types of data used for input to the method;
      generating one or more input fields for the card based on the one or more types of data used for input to the method;
      determining one or more types of data used for output from the method;
      generating one or more output fields for the card based on the one or more types of data used for output from the method.

19. The method of claim 18, wherein determining one or more types of data used for input to the method and determining one or more types of data used for output to the method comprises, for each type of data:
   determining whether the type of data comprises a string data type;
   where the type of data comprises the string data type, concluding that the type of data is a simple type of data for which a field of the card can directly manipulate; and,
   where the type of data comprises a data type other than the string data type, concluding that the type of data is a complex type of data for which just some parts of which can be directly manipulated within a field of the card.

20. The method of claim 16, wherein parsing the file comprises generating a web page card from the file, the web page card comprising:
   a control field indicating an order in which other cards are to be executed upon access of the Web service;
   an access field indicating an address at which the Web service is accessible over a network; and,
   an output field defining output to be displayed on a web page for the Web service when the Web service is accessed at the address.

* * * * *